Dec. 8, 1931.          H. L. JOYCE          1,835,601
                     WHEEL HUB CAP
                   Filed July 25, 1929

Inventor
HAROLD L. JOYCE
By His Attorney
A. D. T. Libby

Patented Dec. 8, 1931

1,835,601

UNITED STATES PATENT OFFICE

HAROLD L. JOYCE, OF EAST ORANGE, NEW JERSEY, ASSIGNOR TO TIFFANY MANUFACTURING COMPANY, OF NEWARK, NEW JERSEY

WHEEL HUB CAP

Application filed July 25, 1929. Serial No. 380,958.

This invention relates to the design of an automotive vehicle wheel hub cap, and while it may be adapted for use on different makes of automotive vehicles, I have chosen to illustrate it as applied to the hub of the wheel of a well-known make of car.

In this particular type of car, the hub cap furnished by the car manufacturer, is simply pushed into position on the hub, relying on the resilience of spring fingers formed on the cap to hold the cap in position, but since this standard hub cap is made of rather heavy stock, the resilience of the fingers is not sufficient to hold the hub cap in place, and many of them rattle off or are easily knocked off.

It is therefore the principal object of my invention to provide a two-piece hub cap so designed that the part or piece which is attached to the wheel hub can be securely anchored in position, and then the cover or cap can be quickly placed in position, the interlocking means between the wheel attachment ring and the cover being a positive one, yet allowing the cover, which is light, to be easily removed for the purposes which will be hereinafter pointed out.

Another object of my invention is to provide a two-piece hub cap which is highly ornamental in design, and which may be quickly put in place or substituted for the original hub cap.

Another object of my invention is to provide a hub cap of two pieces whereby the cover of the cap may be taken off and access given to the nut on the wheel axle, whereby the wheel may be removed without disturbing the attachment ring forming the second part of the hub cap.

Another object of my invention is to provide a two-piece hub cap so designed that it may be cheaply manufactured.

My invention will be readily understood by reference to the attached drawings, wherein.

Figure 2:
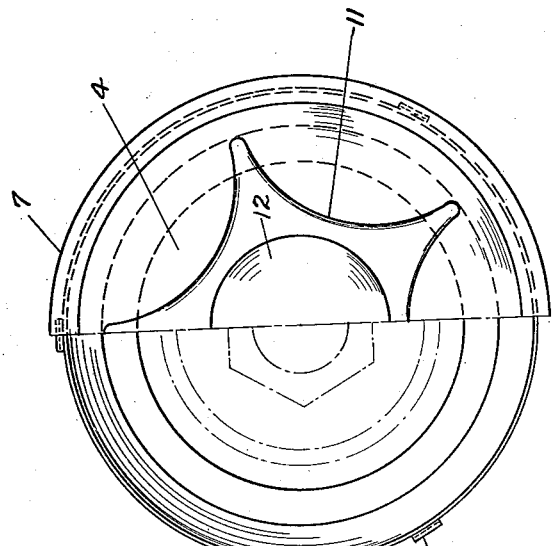
Figure 2 is a front view of the hub cap, one-half of the cover portion of the cap being removed.
Figure 1:
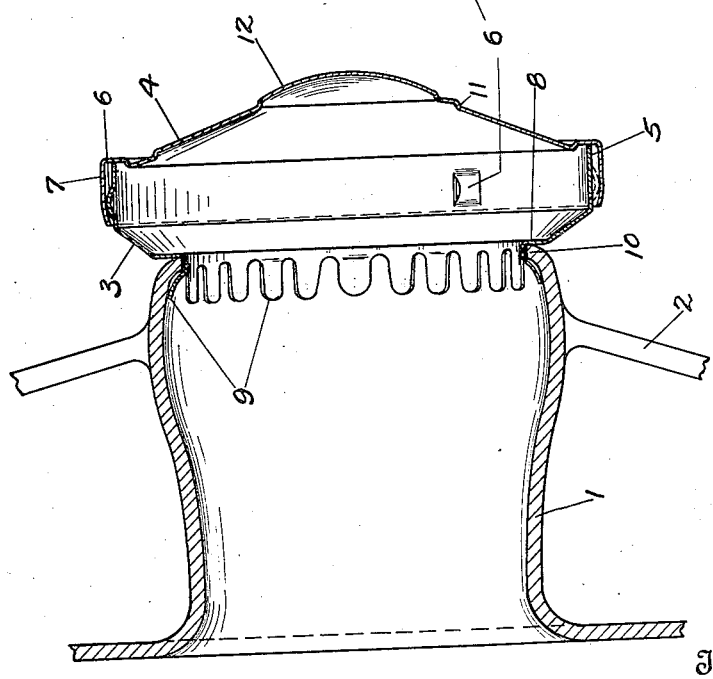
Figure 1 is a part-sectional view of a portion of the wheel hub and the two-piece cap attached thereto.

In the drawings, 1 is the hub of the wheel. In this particular design, the hub 1 has spokes 2 fastened thereto.

My improved form of hub cap comprises two parts—an attachment ring 3 and a cover 4. The ring 3 is provided with an annular flange portion 5 on which projections 6 are formed outwardly to grip the annular rim 7 of the cover 4. There may be as many projections 6 as desired, but I have found that three (as shown in Fig. 2) suffice to hold the cover 4 securely in position.

The attachment ring 3 is provided with a flat annular seat 8 which acts as a stop engaging the end of the hub 1. Adjacent the seat 8, the attachment ring 3 is formed into a plurality of resilient fingers 9, and after the attachment ring 3 is pushed into place and the seat 8 engages the end of the hub 1, a suitable number of the fingers 9 is bent back under the overhanging lip 10 of the hub 1, thereby absolutely locking the attachment ring 3 in position on the hub 1.

It is obvious that in a one-piece hub-cap such as originally furnished with this particular make of car, there is no way of getting at the fingers 9 to bend them back under the lip 10 and only the mere resiliency of the fingers 9 is relied on to hold the cap in position, with the results as heretofore set forth.

After the attachment ring 3 has been applied to the hub 1 in the manner explained, the cover 4 is snapped into position. The rim 7 of the cover 4 has a large amount of resilience and is firmly gripped by the projections 6.

As will be seen from Figure 2, the metal of the cover 4 may be formed into any desired design as indicated by the lines 11, which illustrate the boundary of a five-sided figure, the center of which, 12, is protruded slightly to add to the ornamental effect. It is clear that this design on the face of the cover 4 may take various shapes.

By making the hub-cap in two pieces, I am enabled to cheapen the cost of construction materially, since the attachment ring 3 may be made of lower priced material such as steel properly treated to prevent rusting, while the cover 4 may be made of a material such as brass, which will much more readily take a high finish such as nickel or chromium.

Furthermore, this construction enables me to use thinner metal for both the pieces comprising the hub-cap, since the attachment ring 3 can be securely locked into position through the orifice provided by removal of the cover 4.

While certain of the mechanical details may be varied, I do not wish to be unduly limited in the interpretation of the appended claims.

Having thus described my invention, what I claim is:

1. A wheel hub-cap composed of only two pieces, an annular attachment ring having a plurality of fingers extending from the inner edge of the ring and adapted to be displaced into locking engagement with a part of the wheel hub, and a cap securely held on the outer periphery of the ring by quick detachable means.

2. A wheel hub-cap composed of only two pieces, an annular attachment ring having a plurality of fingers extending from the inner edge of the ring and adapted to be displaced into locking engagement with a part of the wheel hub, said ring having an annular flat surface adjacent said fingers acting as a stop for the ring, and a cap fitting on said ring, said ring and cap having cooperating means whereby the cap is held securely in position but still allowing the cap to be readily removed.

3. A two-piece wheel hub-cap, each piece being a punching, one piece being in the form of a ring having a flat annular seat to engage the end of the wheel hub, said seat having its inner edge terminating in a plurality of fingers normally extending substantially at right angles to the plane of the seat and on a circle having a diameter very nearly the same as the diameter of the opening in the wheel hub, said fingers adapted to be bent into locking engagement with the end of the wheel hub after the ring has been placed on the hub against said seat, thereby leaving the axle nut accessible within the confines of the ring, the second piece being in the form of a cap adapted to fit around a part of said ring, and means cooperating between the ring and cap to hold the cap in place, yet allowing it to be quickly removed for the purpose described.

In testimony whereof, I affix my signature.

HAROLD L. JOYCE.